March 5, 1968   P. W. DAVIS   3,371,567
CUTTING TOOL INSERT AND HOLDER ASSEMBLY
Filed June 2, 1966   4 Sheets-Sheet 1
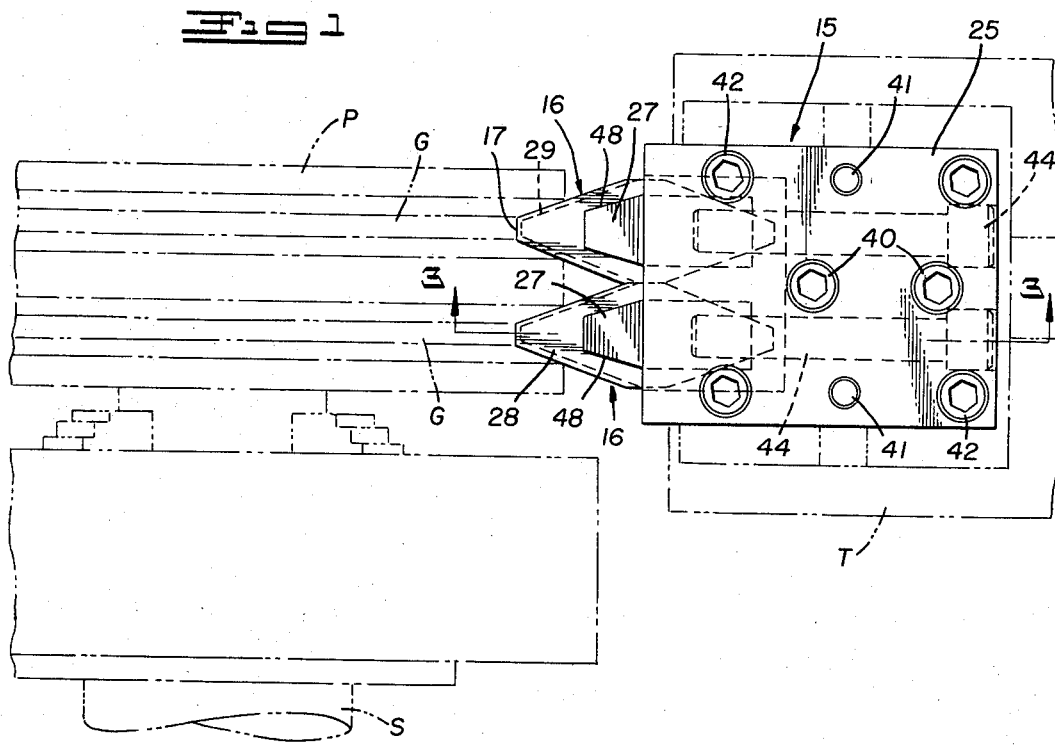
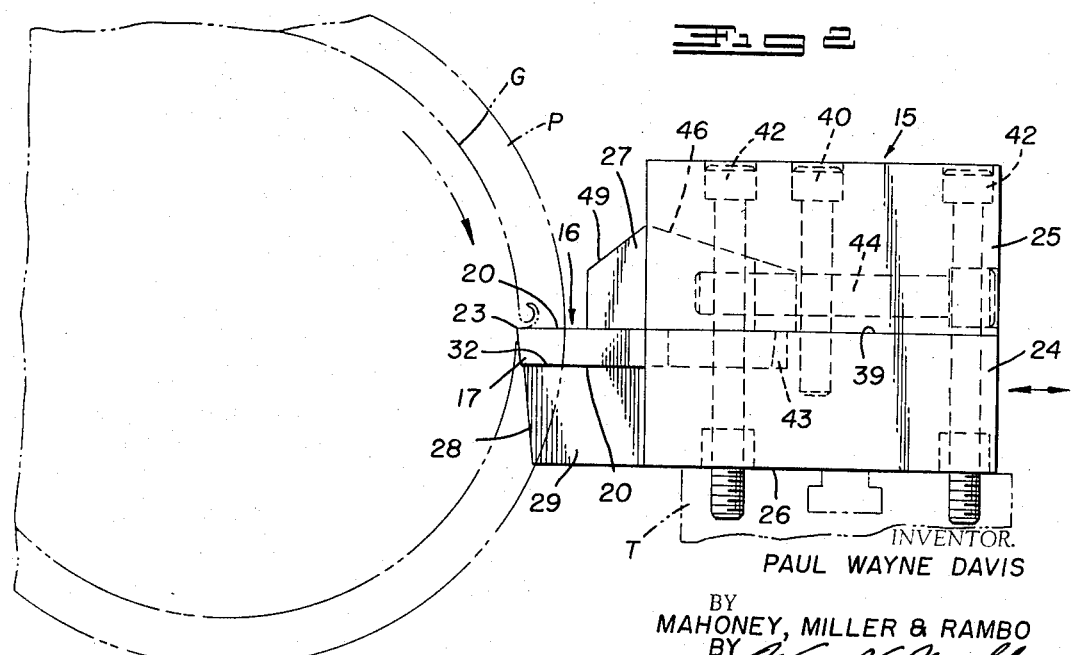
INVENTOR.
PAUL WAYNE DAVIS
BY MAHONEY, MILLER & RAMBO
BY Wm. V. Miller
ATTORNEYS

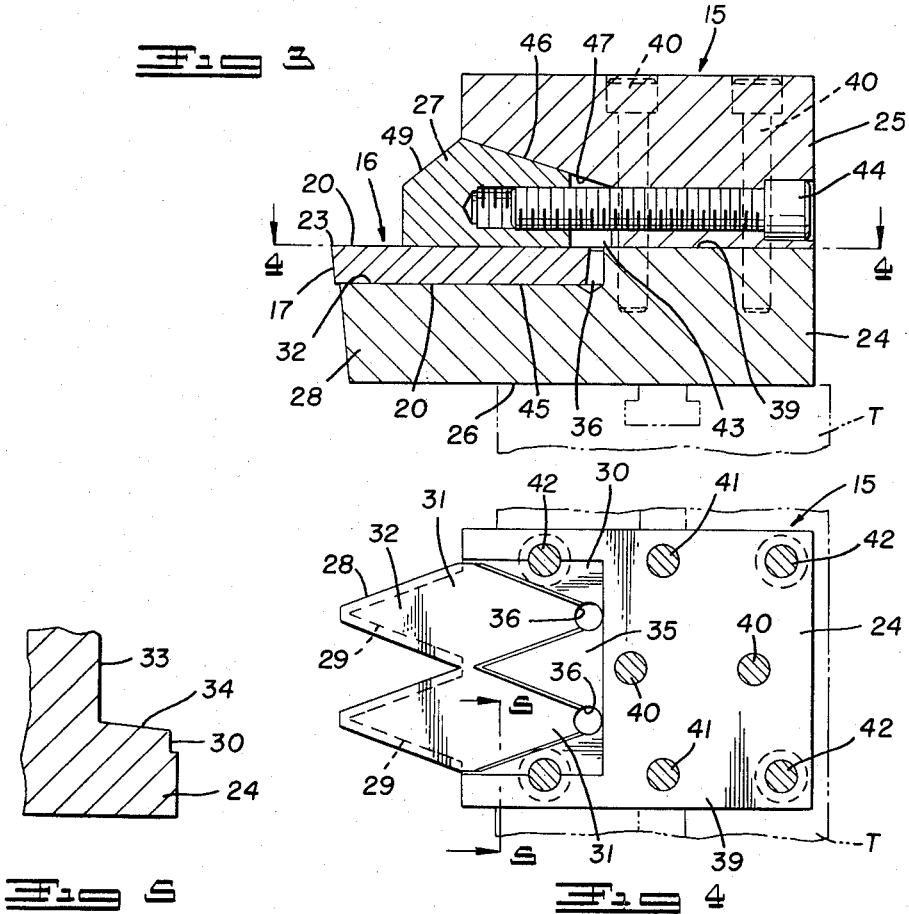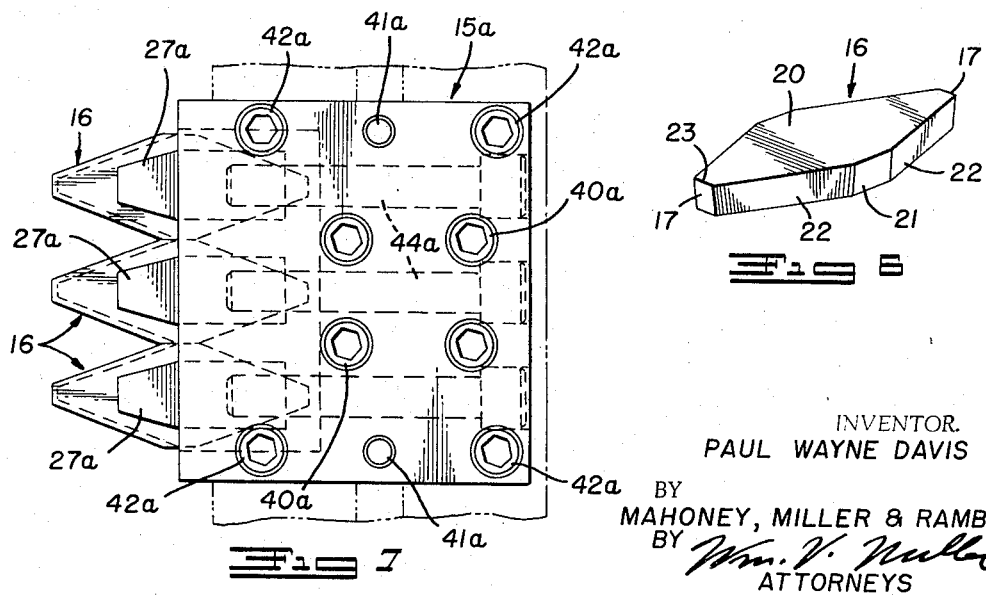

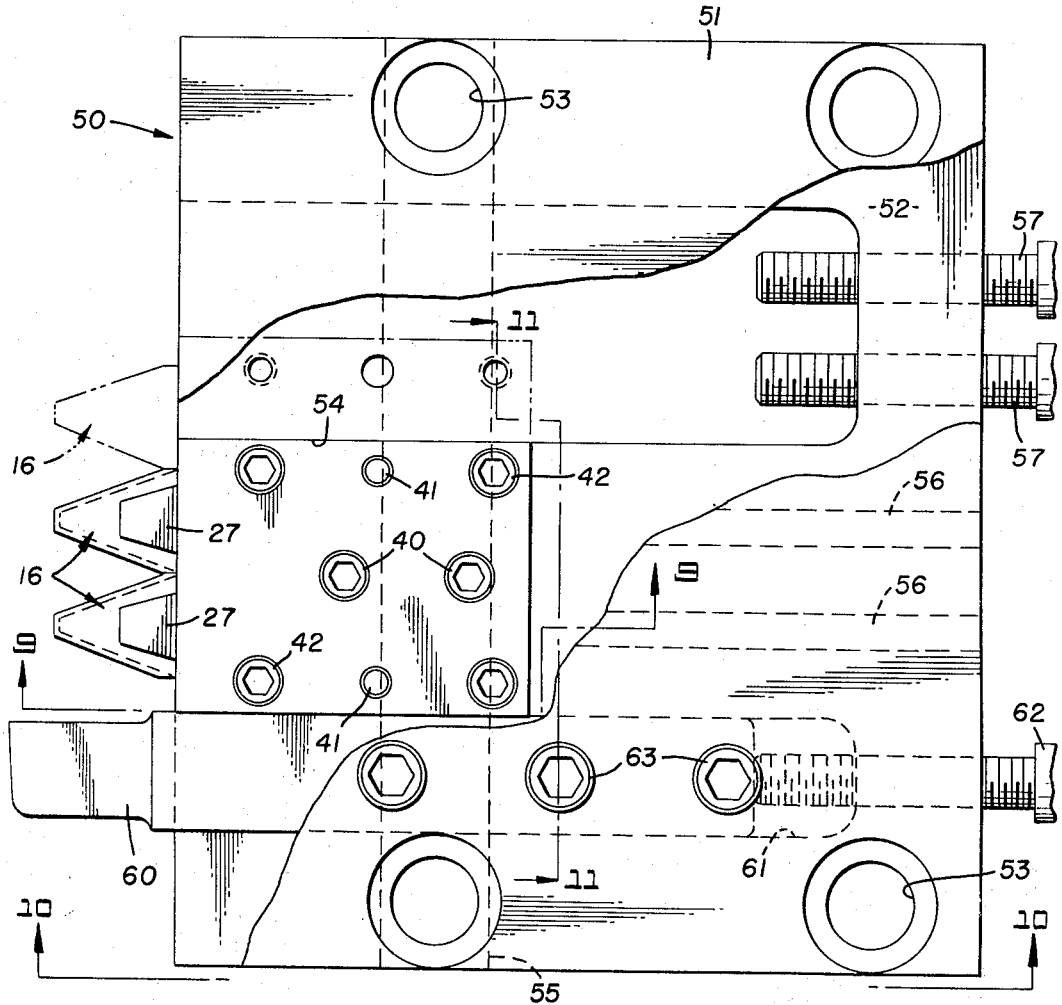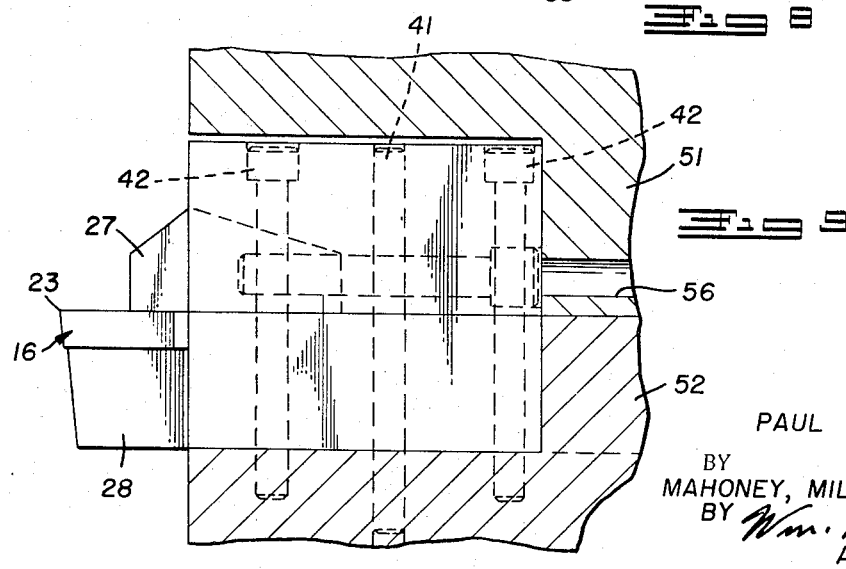

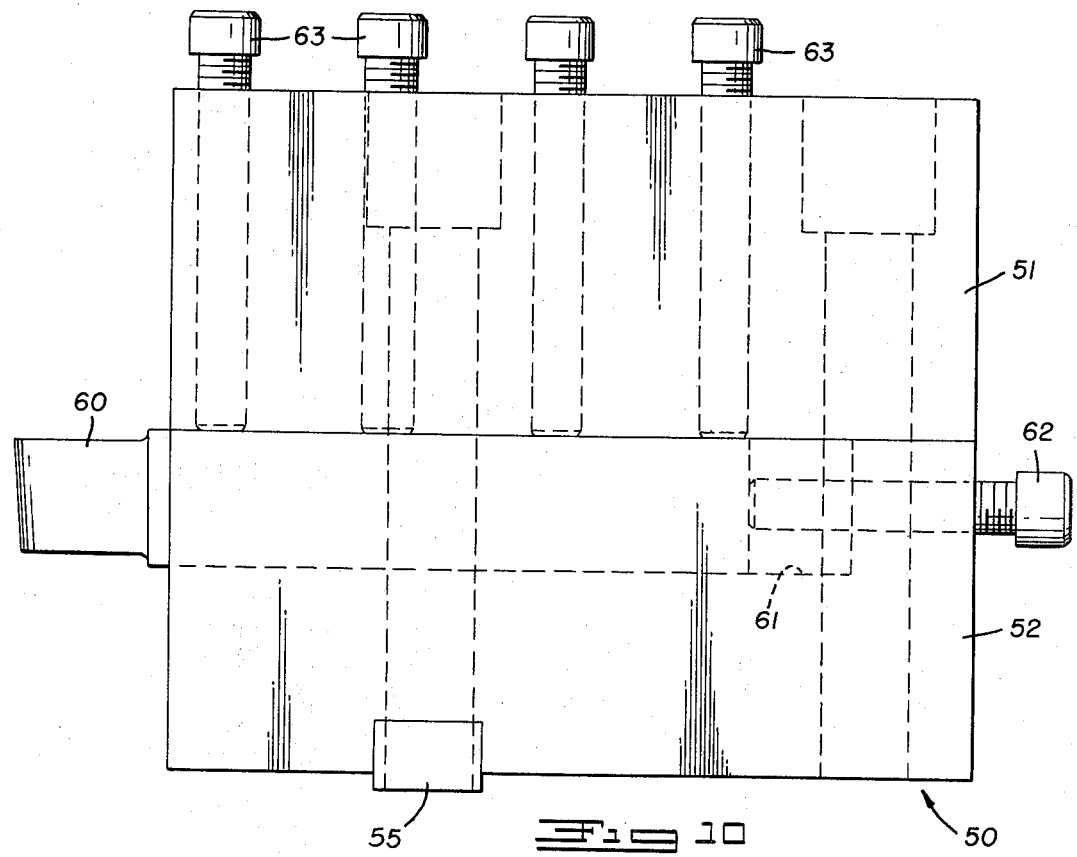
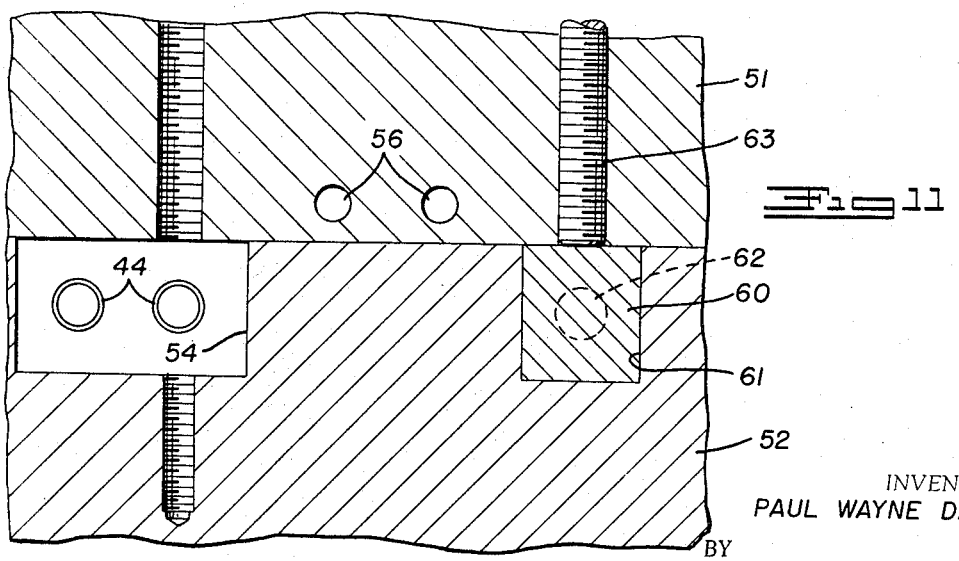

United States Patent Office 3,371,567
Patented Mar. 5, 1968

3,371,567
CUTTING TOOL INSERT AND
HOLDER ASSEMBLY
Paul Wayne Davis, Columbus, Ohio, assignor to The Capitol Machine Company, Columbus, Ohio, a corporation of Ohio
Filed June 2, 1966, Ser. No. 554,823
5 Claims. (Cl. 82—36)

My invention relates to a cutting tool insert and holder assembly. It relates, more particularly, to a holder for receiving and retaining in side-by-side relationship a plurality of throwaway metal cutting inserts or bits of the double-cutting end type with each in either of its reversible positions. This type of tool assembly is particularly useful in simultaneously cutting a plurality of parallel grooves in a workpiece, for example, in cutting side-by-side grooves in a multiple sheave or pulley blank that is rotated about its axis and is simultaneously and gradually advanced into cutting engagement with the tool.

The main object of this invention is to provide an insert and holder of the general type indicated in which the insert is of the throwaway reversible type and is designed for mounting in the holder provided by this invention in either position and in any desired number in side-by-side relationship so that in simultaneously cutting multiple grooves they are accurately formed in parallel relationship, the entire assembly being of such a nature that it can be readily mounted on the desired machine.

Various other objects will be apparent.

In the accompanying drawings, I have illustrated preferred embodiments of my invention but it is to be understood that these are by way of example only.

In these drawings:

FIGURE 1 is a plan view of the assembly illustrating diagrammatically how it forms the grooves in a pulley blank.

FIGURE 2 is a side elevational view of the assembly shown in FIGURE 1.

FIGURE 3 is a vertical sectional view taken along line 3—3 of FIGURE 1.

FIGURE 4 is a horizontal sectional view taken along line 4—4 of FIGURE 3 but with the cutting tool inserts removed.

FIGURE 5 is a detail in enlarged vertical section taken along line 5—5 of FIGURE 4.

FIGURE 6 is a perspective view of one of the cutting tool inserts.

FIGURE 7 is a plan view similar to FIGURE 1 but showing an assembly of a greater number of inserts.

FIGURE 8 is a plan view, partly broken away, of an assembly including a combination holder for the groove-cutting tool inserts and a facing-cutting tool insert.

FIGURE 9 is a fragmentary vertical sectional view taken along line 9—9 of FIGURE 8.

FIGURE 10 is a side elevational view taken along line 10—10 of FIGURE 8.

FIGURE 11 is a fragmentary vertical sectional view taken along line 11—11 of FIGURE 8.

With reference to the drawings, in FIGURES 1 to 4 I have illustrated one cutting tool insert holder embodying my invention. In this example, the holder 15 is designed to hold a pair of the insert cutting tools 16 in side-by-side relationship with their cutting bits or tips 17 on the outwardly projecting ends thereof which project toward, for example, a pulley blank P. This pulley blank is adapted to have the grooves G cut in its periphery in parallel relationship. The pulley blank may be mounted on one slide carriage or table of a lathe and be rotated by a spindle S. The holder 15 may be mounted on another table or carriage T of the lathe which can be moved to advance the tool inserts 16 relative to the blank P and which can also be moved transversely to properly locate the tools axially of the pulley blank P.

Each cutting tool insert is of the form shown in FIGURE 6. It is mainly of double-triangular form having oppositely extending triangular ends. It has flat upper and lower parallel faces 20. Its entire peripheral edge is formed with an undercut taper or draft and the edge includes the straight parallel mid-sections 21 and the converging end sections 22. The converging sections form the triangular ends which terminate in the tips 17. The tips 17 being undercut provide the sharp cutting edge 23 at their upper corners. With this form, the inserts 16 are reversible so that the cutting tips 17 at both ends can be used before they are discarded.

The holder 15 comprises three main elements. They include a lower insert-receiving block 24 and an upper clamping block 25. The lower block 24 is adapted to rest on and be held on the table T, being provided with a flat lower supporting surface 26 which rests on a similar surface or the table. The third element of the holder is a wedge clamp member 27 adapted to be positioned between the block members 24 and 25. The details of these parts of the holder 15 and associated parts and the manner in which they cooperate with the inserts 16 will now be described.

The lower block 24 is a flat block, shown as rectangular in outline, with the outwardly projecting insert-supporting shelves or lugs 28 at one side thereof. In this example, two of these shelves 28 are shown as the holder is designed to hold two of the inserts 16 in side-by-side relationship. The shelves 28 are integral with the block and each is of substantially the same triangular shape as one end of an insert 16 and of substantially the same area at its upper flat surface as the area of the lower face 20 of the insert. Also, as indicated, the side edge surfaces 29 of the shelves are provided with an inward taper or draft. These shelves, as shown in FIGURE 1, will project toward the pulley blank P. The block 24 has at its edge adjacent the shelves 28 a rectangular recess 30 formed in its upper surface and in this recessed area it also has the upwardly and outwardly opening insert-receiving sockets 31. Each of these sockets is of triangular form, complemental to that of one triangular end of an insert 16, with one side opening outwardly over the upper flat triangular surface 32 of the associated shelf 28. As indicated in FIGURE 5, the bottom 33 of each socket 31 is flat, so that the flat lower face 20 of the insert will rest thereon, and its border or side wall is provided with an inward taper 34 complemental to the draft on the edge of the insert 16. Thus, the triangular sockets are complemental to the triangular inner ends of the inserts and will receive and retain the inserts side-by-side. It will be noted from FIGURE 4 that the triangular dividing partition between the two insert sockets 31 comes to a point so that the two adjacent straight edges 21 of adjacent inserts may be in contact. At the inner end of each of the sockets 31, a vertical bore 36 is provided which permits clearance at the inner end of each insert.

The clamp block 25 is of rectangular outline and has a flat lower surface 39 adapted to bear against the flat upper surface of the lower block 24. The block 25 is clamped against the block 24 by a plurality of vertically disposed clamp bolts 40 which are passed through counterbored openings in the block 25 and threaded into aligning openings in the block 24. To locate the member 25 accurately relative to the member 24, dowel pins 41 are provided and will extend through aligning openings in the members 24 and 25 and may extend into the table T. Hold-down bolts 42 also extend through aligning openings in the blocks 24 and 25 and are threaded into the table T to hold the assembly down on the table. These openings are counterbored at both ends so as to provide for inversion of the holder 15 on the table T.

In this example, two of the wedge clamps 27 are disposed in a socket 43 which opens outwardly and downwardly at the edge of the block 24 that is adjacent the shelves 28. The two wedge members 27 are positioned in the socket and are held therein by means of a pair of parallel bolts 44 which are passed through counterbored openings extending from the opposite edge of the block into the socket 43. These bolts have their inner ends extending through the socket 43 and are threaded into the inner edges of the wedges 27. It will be noted from FIGURE 3 that the lower ssurface 45 of each wedge 27 is flat and at the same level as the flat lower surface 39 of the block 25. It is provided with a downwardly and inwardly inclined upper surface 46 which cooperates with a complemental angular surface 47 that forms the upper wall of the socket 43. Thus, movement of each wedge 27 inwardly by means of one of the bolts 44 will cause that wedge member to bear more firmly against the recessed surface 30 in the top of the block 24 or against the upper face 20 of the insert 16 with which it cooperates if it is in the cooperating socket 31. The inserts 16 will be slightly thicker than the depth of the sockets 31 to ensure contact of the lower surface 45 of the wedge 27 with the upper faces 20 of the inserts 16. The inner portions of the wedges 27 (FIGURE 1) have their side edges parallel but the side edges at their outer ends converge as indicated at 48 to provide tapered or slightly pointed outer ends which lie over the triangular shelves 28 or the triangular outer ends of the inserts 16 resting thereon. These outer ends may also incline downwardly and outwardly as indicated at 49.

In use, the inserts 16 are positioned in the sockets 31 in side-by-side relationship and beneath the wedge 27 which, at this time, is an outward or nonclamping position. Either end of each of the inserts may be positioned in its socket 31 but due to the taper on the edge thereof, it can only be positioned to locate the cutting edge 23 on the outer end at its upper corner. By means of the bolts 44, the wedge member 27 can now be drawn inwardly to tightly clamp the inserts 16 downwardly in the sockets 31 and against the shelves 28. Assuming the pulley blank P is rotated clockwise in FIGURE 2, the cutting tools may be advanced into the blank and the sharp corners 23 will cut into the blank producing the parallel grooves G. Due to the taper of the shelves 28, they will follow the cutting tools without contacting the sides of the grooves.

The sockets 31 will be precise milled sockets and the block 24 can be heat treated. The inserts 16 will be firmly held side-by-side, thus holding the center line of each groove. Each insert is individually and securely clamped by the wedge-type clamp. The inserts can be removed and reversed or can be replaced. The insert holders can be used on front or rear tables of any machine, by simply inverting the holder and mounting it on a riser block or tool block to obtain the proper center line.

The holder can be modified to receive various numbers of inserts in side-by-side relationship. Another example is illustrated in FIGURE 7 where the holder 15a is designed to receive three of the inserts 16 in side-by-side relationship. The block 25a is of greater area and is held in position by the clamping bolts 40a located as indicated. The entire holder 15a is held down by means of the bolts 42a. Locating dowel pins 41a are also provided in this instance. Each wedge member 27a is positioned by means of an associated bolt 44a.

The inserts can also be mounted in a block with other types of tool holders, for example, a holder for a tool to face the side of the pulley blank. Such an arrangement is illustrated in FIGURES 8 to 11 where the entire assembly is indicated by the numeral 50.

The mounting blocks for this assembly comprise the upper block 51 and the lower block 52. Counterbored openings 53 are provided to receive hold-down bolts to hold the two blocks together and on the table of the machine. A key 55 may be provided at the lower surface of the block 52 for locating it on the table. In the upper surface of the lower block 52, adjacent one edge thereof, a socket 54 is provided which opens upwardly and outwardly and which may receive either the double-insert holder 15 of FIGURE 4 or the triple-insert holder 15a of FIGURE 7, as indicated in phantom in this figure. The blocks 51 and 52 are provided with suitably located openings of a proper nature for receiving the hold-down bolts 40 or 40a, and the dowel pins 41 or 41a, when the holder 15 or the holder 15a is positioned in the socket 54. Bores 56 extend into the socket 54 from the opposite edge of the block 52 and are used in positioning the holders properly in the socket. olts 57 extend from this edge of the block into the socket 54 for engaging the inner edge of additional cutting tools which may be mounted in this socket alongside the holder 15 or 15a mounted therein.

As indicated above, the assembly 50 may also include a facing tool insert which is indicated at 60. This insert may be positioned in a socket 61 which is formed in the lower block 52 parallel to the socket 54. The insert 60 will project from the end of the socket in the same direction as the inserts 16. The inner end of the socket 61 is closed but has an adjusting bolt 62 extending into the socket for adjusting it longitudinally of the socket. For holding the tool insert 60 in a desired position, clamp bolts 63 are threaded down through the upper block 51 and engage the top surface of the tools 60.

With this arrangement, the grooving tool inserts are clamped in desired positions in the assembly along with the facing tool insert. As indicated, other tools may also be included in this assembly.

It will be apparent from the above that my invention provides a novel tool insert and means for clamping a plurality of them in accurate side-by-side positions so as to properly form the pulley grooves. The inserts are of the throwaway type and they and the holders are of such a nature that they may be reversed and both ends be used before discarding.

Many other advantages will be apparent.

Having thus described this invention, what is claimed is:

1. A tool insert and holder assembly comprising a pair of superimposed clamping blocks having an outwardly opening socket therebetween for receiving a plurality of inserts disposed in side-by-side edge contacting relationship, and a wedge clamp mounted in said socket for movement into and out of wedging relationship with said inserts, said socket having a pocket for the inserts for receiving them and supporting them with one face exposed, the opposed wall of the socket being angled and converging inwardly toward the first wall, said wedge clamp having a surface for engaging the face of the insert and an opposed angled surface for cooperating with said angled wall, and means for moving said wall clamp in and out of the socket to vary the wedging action on said tool inserts, said pocket being divided into chambers complemental to the shape of the inserts, said wedge clamp including individual wedge members for independently engaging the faces of the respective inserts, said inserts having opposed triangular ends, said chambers being triangular for receiving one end and being formed in one of said blocks, said block having outwardly extending triangular shelves which underlie the opposed outer triangular ends of said inserts.

2. Structure according to claim 1 including additional blocks having sockets for receiving and retaining said holder and additional tool inserts, and retaining means cooperating with said sockets.

3. Structure according to claim 1 in which the tool insert is undercut and the respective shelf which also supports it is undercut.

4. Structure according to claim 3 in which the means for moving the respective wedge members comprises a screw passing through a bore in the one block and threaded into the wedge member, and means for clamping the blocks together comprising screws extending through one block into the other block.

5. Structure according to claim 1 in which the pocket for each insert is complemental in triangular shape to the end of the insert and has a taper complemental to the undercut of the insert end.

References Cited
UNITED STATES PATENTS

| | | | |
|---|---|---|---|
| 180,409 | 8/1876 | Alvord | 29—97 |
| 1,626,953 | 5/1927 | Muller | 82—36 |
| 2,348,052 | 5/1944 | Boillat | 29—97 |
| 3,084,416 | 4/1963 | Broughton | 29—96 |
| 3,136,031 | 6/1964 | Cassidy | 29—97 |

LEONIDAS VLACHOS, *Primary Examiner.*